United States Patent
Ben-Shaul et al.

(10) Patent No.: US 9,613,045 B2
(45) Date of Patent: *Apr. 4, 2017

(54) SYNCHRONIZATION OF DESKTOP IMAGES WITH SMART IMAGE MERGING

(71) Applicant: VMware, Inc., Palo Alto, CA (US)

(72) Inventors: Israel Zvi Ben-Shaul, Ramat HaSharon (IL); Tal Zamir, Haifa (IL); Leonid Vasetsky, Zikhron Yaakov (IL); Guy Yogev, Raanana (IL)

(73) Assignee: VMware, Inc., Palo Alto, CA (US)

( * ) Notice: Subject to any disclaimer, the term of this patent is extended or adjusted under 35 U.S.C. 154(b) by 477 days.

This patent is subject to a terminal disclaimer.

(21) Appl. No.: 14/169,016

(22) Filed: Jan. 30, 2014

(65) Prior Publication Data

US 2014/0149347 A1    May 29, 2014

Related U.S. Application Data

(63) Continuation-in-part of application No. 13/732,306, filed on Dec. 31, 2012, now Pat. No. 9,069,579, which is a continuation-in-part of application No. 13/732,312, filed on Dec. 31, 2012, now Pat. No. 9,417,889, application No. 14/169,016, which is a continuation-in-part of application No. 13/732,317, (Continued)

(51) Int. Cl.
| | |
|---|---|
| *G06F 9/455* | (2006.01) |
| *G06F 9/46* | (2006.01) |
| *G06F 7/00* | (2006.01) |
| *G06F 15/16* | (2006.01) |
| *G06F 15/177* | (2006.01) |
| *G06F 17/30* | (2006.01) |
| *G06F 9/44* | (2006.01) |
| *G06F 9/445* | (2006.01) |

(52) U.S. Cl.
CPC ...... *G06F 17/30174* (2013.01); *G06F 9/4443* (2013.01); *G06F 9/4451* (2013.01)

(58) Field of Classification Search
None
See application file for complete search history.

(56) References Cited

U.S. PATENT DOCUMENTS

| | | |
|---|---|---|
| 6,742,161 B1 | 5/2004 | James et al. |
| 7,162,719 B2 | 1/2007 | Schmidt |

(Continued)

*Primary Examiner* — Bing Zhao

(57) ABSTRACT

Methods and systems for n-way cloning and synchronization of a user desktop image are provided. Example embodiments provide a Cloning and Synchronization System ("CSS") which binds a server stored CVD object representing the user's desktop image to one or more endpoint devices. Each endpoint device receives a clone of the CVD object that comprises one or more layers of the server CVD depending upon the suitability of the endpoint device hardware and operating system to the server stored desktop. The cloned CVDs in the endpoint devices are then kept synchronized by synchronization operations. In one embodiment, the CSS allows only one endpoint device to push up changes to the server CVD. User files are synchronized with the all endpoints using a live sync process. System and managed applications may be intelligently merged into an inactive device rather than overwriting data modified on the inactive device.

27 Claims, 6 Drawing Sheets

Related U.S. Application Data filed on Dec. 31, 2012, now Pat. No. 9,063,756, application No. 14/169,016, which is a continuation-in-part of application No. 13/732,320, filed on Dec. 31, 2012, now Pat. No. 9,477,491.

(60) Provisional application No. 61/581,501, filed on Dec. 29, 2011.

(56) References Cited

U.S. PATENT DOCUMENTS

| | | | |
|---|---|---|---|
| 7,356,679 B1 | 4/2008 | Le et al. | |
| 7,921,189 B2 | 4/2011 | Kapoor et al. | |
| 9,110,727 B2 * | 8/2015 | Brock | G06F 9/5077 |
| 2002/0019860 A1 | 2/2002 | Lee et al. | |
| 2008/0077634 A1 | 3/2008 | Quakenbush | |
| 2008/0244028 A1 | 10/2008 | Le et al. | |
| 2009/0043840 A1 | 2/2009 | Cherukuri et al. | |
| 2009/0198805 A1 | 8/2009 | Ben-Shaul et al. | |
| 2010/0088397 A1 | 4/2010 | Jaudon et al. | |
| 2010/0107113 A1 | 4/2010 | Innes et al. | |
| 2010/0306306 A1 | 12/2010 | Kamay | |
| 2010/0306771 A1 | 12/2010 | Kamay et al. | |
| 2010/0332682 A1 | 12/2010 | Sharp et al. | |
| 2011/0153716 A1 | 6/2011 | Malakapalli et al. | |
| 2011/0251992 A1 | 10/2011 | Bethlehem et al. | |
| 2012/0329430 A1 | 12/2012 | Chatani | |

* cited by examiner

SYNCHRONIZATION OF DESKTOP IMAGES WITH SMART IMAGE MERGING

CROSS-NOTING TO RELATED APPLICATIONS

This Application is a continuation in part of U.S. patent application Ser. No. 13/732,306, filed on Dec. 31, 2012, entitled "N-Way Synchronization of Desktop Images; U.S. Provisional Application No. 61/581,501, filed Dec. 29, 2011, entitled Multi-Device Cloning and Synchronization; U.S. patent application Ser. No. 13/732,312, filed on Dec. 31, 2012, entitled "Fast Provisioning of a Centralized Virtual Desktop Using Linked Clones;" U.S. patent application Ser. No. 13/732,317, filed on Dec. 31, 2012, entitled "Device Dependent Rules for Synchronizing Desktop Images and Managing Hardware Dependencies;" and U.S. patent application Ser. No. 13/732,320, filed on Dec. 31, 2012, entitled "Independent Synchronization of Virtual Desktop Image Layers;" and is also related by subject matter to U.S. Pat. No. 8,301,874, issued Oct. 30, 2012, entitled "Atomic Switching of Images in Desktop Streaming Over Wide Area Networks;" and U.S. Pat. No. 7,953,833, issued May 31, 2011, entitled "Desktop Delivery for a Distributed Enterprise," all of which are incorporated herein by reference in their entireties.

TECHNICAL FIELD

The present disclosure relates to methods, techniques, and systems for provisioning and synchronizing desktop images and, in particular, to methods, techniques, and systems for provisioning and synchronizing a desktop image across multiple, potentially heterogeneous, devices.

BACKGROUND

The growing popularity of new computing devices, most notably tablet computers, has created demand for access by a tablet user to his/her corporate computing environment using these devices from anywhere, including access to applications, content, and user profiles. There are several challenges associated with this requirement:

a. Tablet computers today are predominantly running non-Windows operating systems, whereas most corporate applications are still Windows-based, especially client applications that execute on personal computers ("PCs").

b. Tablet computers are designed to be mostly "reading" devices with limited "write" capabilities. This means that many corporate employees need to be able to work with multiple devices, including traditional Windows-based PCs to generate content, as well as with the new tablet devices, smart phones, and the like.

c. These tablet devices present a security hazard since they are typically not controlled by a corporate IT department, do not run company anti-virus software, data-leak protection software and other software that provides some security measures.

One potential solution to enable a tablet computer access to a corporate environment is to use one of many existing programs that allow a user to connect the tablet directly to the user's personal PC via a "remote desktop protocol" program, which is then connected to the corporate environment, including access to applications and corporate data. While this "chained" model may work for fixed desktops that are always turned on and connected online to the corporate network, it does not work when the corporate PC is a laptop—which comprises the majority of corporate PCs. Unlike desktop computers, laptop computers are not turned-on when not in use (they are typically in "sleep" or "hibernate" mode). Furthermore, laptops and desktops are often located away from the office (e.g., at home) and the organizational intranet, in both cases inaccessible from a remote connection.

An alternative approach is to replace the personal PC with a personal virtual machine that is hosted in the corporate data-center and contains the same set of applications and data as the physical PC. This typically requires a system such as a Virtual Desktop Infrastructure (VDI) system that also knows to manage a pool of VMs and redirect users to their personal VMs. Using such a centralized virtual desktop, tablet users gain universal access to their PC. However, there are two main drawbacks to this approach.

First, by centralizing the personal PC in the data center, the user now has to compromise her working environment even when she can and wants to work directly with a local (physical) PC. In other words, even when the user is present in the office and could be working directly with the local PC, the user is required to use the virtual desktop as if the user is remote. Working remotely typically means a poor user-experience since every interaction with the central desktop involves network round-trip messages and therefore becomes sensitive to latency and bandwidth constraints. Furthermore, the user cannot work offline (disconnected to the data center), an important consideration for laptop and mobile device users.

Second, the cost associated with supporting a centralized infrastructure that hosts all corporate PCs in the data center is extremely high, both in terms of compute and storage costs. For a population of existing laptop users, where the hardware resources already exist at the endpoints (the laptops), duplication in the data center results in a significant waste of resources.

DETAILED DESCRIPTION

Figure 1:
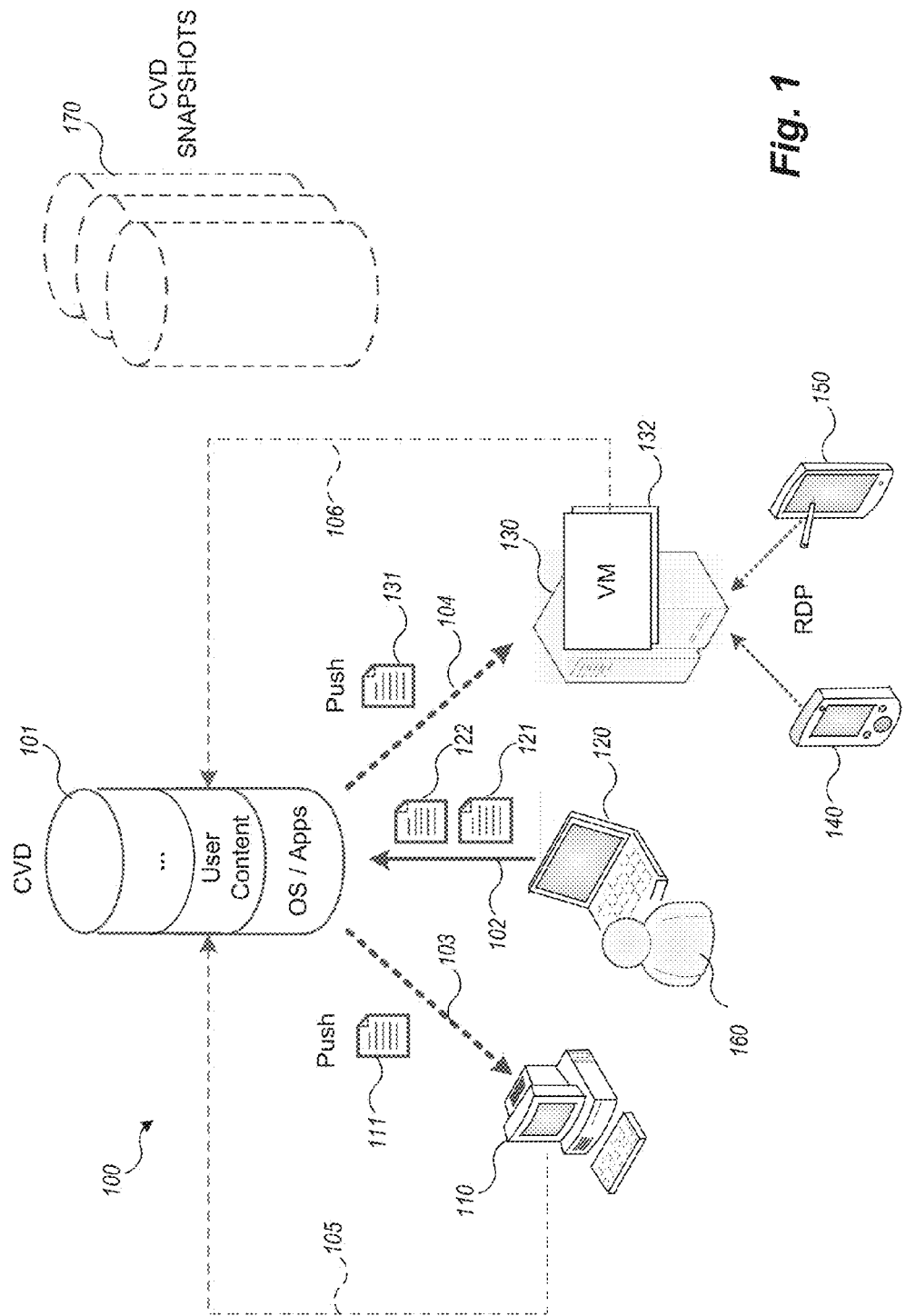
FIG. 1 is an example block diagram of an environment for using a Cloning and Synchronization System.

Embodiments described herein provide enhanced computer- and network-based methods and systems for offering a combination of universal access to a centralized copy of a desktop when needed, along with native user experience through local execution, whenever possible. Example embodiments provide a Cloning and Synchronization System ("CSS"), which provides an effective method to clone a logical desktop image, typically stored in a data center, across multiple devices, along with near continuous synchronization of user content. This allows access to a common desktop to be generalized beyond virtual and physical machine sharing to any number of different machines, with potentially heterogeneous hardware, such as a PC, a laptop, and a mobile device. The CSS combines universal access with the benefits of local execution through use of a CSS server in the data center and a CSS client on each target device. The CSS server may be a special purpose computer, a general purpose computer suitably programmed, or a set of logic or instructions that control one or more processors in one or more computer systems in the data center to manage the cloning and synchronization of a user's desktop. The CSS client typically comprises a set of logic or instructions that control receiving and managing the cloned desktop on a target device and synchronizing updates thereafter.

The target computing device (also referred to as "endpoint" or "endpoint device") can be a virtual or a physical machine and can have limited physical storage space that may be smaller than the size of the entire desktop image that is centrally maintained for that computing device. The cloned desktop is accordingly adjusted, for example, by downloading only some of the files and using stubs in place of some files with "on-demand" access by a device driver capable of recognizing how to load the files that have not yet been downloaded. These and other delayed delivery mechanisms may also be used as described in related U.S. Pat. No. 8,301,874.

As used herein, "desktop image" (or just "image") refers to data and executables that comprise substantially the entire content that is stored at a target computing device, including typically the operating system (OS), applications, configurations and settings, as well as all user data and files. For example, in some embodiments, a desktop image includes all files that are stored on one or more physical storage devices (e.g., such as hard disks, solid state storage devices, and the like) in a computing device. In some embodiments a desktop image excludes files that are temporary or transient in nature and that do not need to be centrally managed. A desktop image may include a collection of files that store data in compressed or non-compressed form, and the data may be unformatted (e.g., binary data, raw disk blocks, raw data partitions, etc.) or structured as various types of files (e.g., data files, DLL files, executable files, personal user files of various file types, various types of configuration files, etc.) and/or any other type of data structure format.

The collection of files included in a desktop image (the logical desktop image) is referred to as a Centralized Virtual Desktop (CVD) or CVD object. The CVD object, as described further below, comprises a plurality of layers, some or all of which may be cloned to a target computing device depending upon the hardware and operating system of the target device and desirability for synchronizing some or all of the information. For example, heterogeneous devices with different versions of an operating system (such as a Windows XP and Windows 7) may be able to synchronize desktop image information. In other situations they may not be able to synchronize OS level information, but may be able to synchronize system applications. In an example embodiment, the layers may comprise one or more of: user data, profiles, user and system settings, user applications, machine identity, a base image including one or more of an OS, infrastructure software, and core applications, and a driver library or equivalent. Some embodiments decouple the driver library and other hardware dependencies from the rest of the CVD so that, once cloned, these hardware specific aspects are not overwritten by a synchronization activity.

Related U.S. Pat. No. 7,953,833 describes use of a CVD, as a virtual representation of a desktop that can be bound at any point to exactly one physical device. The system described therein allows an administrator to "re-assign" the CVD from one device to another target (endpoint) device. The target computing device can be a virtual machine, in which case the re-assignment occurs from a physical to a virtual device and incorporates the needed transformations to adapt the CVD to the new (virtual) hardware.

One use case addressed by the CVD mechanism described in U.S. Pat. No. 7,953,833 is to provide business continuity in the face of disaster recovery: for example, when a user's laptop is lost or damaged, an Information Technology (IT) administrator can re-assign the CVD to a centralized VM, which in turn enables the user to access her desktop instantly through a remote desktop protocol. Furthermore, when the user eventually receives a replacement physical laptop, the CVD can be re-assigned back from the virtual machine to the new physical machine and the user allowed to continue to work locally. Another use case addressed by this CVD mechanism is to restore the system from an older snapshot, thereby allowing the administrator to repair a device having corrupted software or an error to a previous system state with a last known working configuration.

However, the mechanism described in U.S. Pat. No. 7,953,833 is limited. A CVD can be assigned to only one (physical or virtual) device at a time. This one-to-one mapping between device and CVD may work for the disaster recovery use case, where there is inherently only one device that is being used by a user at a time, but is not typically applicable for cases in which the user maintains more than one active device at a time. For example, when a user is sharing a logical desktop image with multiple endpoints, the user may perform updates to data, applications, settings, etc., from any of the devices, and changes that are made to a device that is not bound to the CVD object would be lost whenever the CVD is re-assigned to that device. Another drawback of the one-to-one mapping is that, in cases where a user transitions between one device and another frequently (as may be the case with tablets or other mobile devices and PCs), the re-assign operation, which consists of transferring data over the network (typically a wide area network) and rebooting the target device, can take longer than the user is willing to tolerate. These scenarios are exacerbated by the proliferation of mobile devices and tablets and their use alongside PCs.

Architecture and Use of the Cloning and Synchronization System

The CSS architecture extends the notion of the general CVD mechanism to provide a one to many, CVD to multiple target device, architecture and to keep the multiple target devices synchronized. In one embodiment, one of the multiple target devices is designated as the "active" device or "master." Only changes made by an active device to user content and/or system content when applicable may be propagated (pushed up) to the server stored CVD. These changes are then pushed down to the other, inactive, target machines to keep them synchronized. That way, when a different target device becomes the new active device, e.g., the user switches to using another one of her devices, it is already synchronized and contains the latest updates. Applicability refers to that in some cases only some types of synchronization between devices is desired. For example, devices with different operating systems may not participate in OS level and/or in application level synchronization.

Generally, the user content of the target devices is kept updated on a near continuous basis, termed "live sync," while the rest of the content (e.g., the OS, applications, system software and configuration files, and the like), when applicable, is synchronized on a "lazy synchronization"

basis. That is, content that potentially requires the user to reboot or that requires other interruption of the user may be downloaded and/or partially integrated into the system in a staging area but not immediately integrated into the device (e.g., registry, OS, etc.) until convenient for the user. Other embodiments of the CSS may perform synchronization at other times and may download non-user content on a streamed, delayed, or on-demand type of basis. CSS synchronization occurs without the user needing to use any type of check-in or check-out procedure or be otherwise aware that synchronization is occurring. Thus, aside from an occasional need to reboot the system, the synchronization process is relatively transparent to the user.

In addition, in some embodiments, inactive devices (the devices not designated the active/master device) are permitted to make changes locally to user content (such as user files, user settings, and the like) but are not permitted to make changes to system related content such as the OS, registry settings, system software, drivers and the like unless and until the device becomes the active device. These local changes to user content are merged with updates from the server CVD image pushes in a manner described below. In some embodiments, users of devices including inactive devices are permitted to install personal "user-installed" applications in a separate layer (e.g., see 411 in FIG. 4), which are distinct from the common set of applications that comprise the base image. These personal user apps can reside side by side with the commonly shared base image, and may be synchronized or not with the rest of the devices depending upon the implementation and/or configuration parameters. In some embodiments, inactive devices are permitted to push changes to (only) user content in a more immediate fashion to the server CVD, which are then propagated in near real-time to all of the other devices. This latter mechanism allows local changes to be integrated and pushed to other devices to be seen more immediately. Such a mechanism may be particularly helpful when a user is simultaneously using two devices, such as a tablet or smartphone and a PC. Further, in some embodiments, inactive devices, for example a master device that has gone offline temporarily for a hardware replacement, may have modified applications and other portions of the base image while the device is offline. These modifications may be thereafter merged with a downloaded CVD image when the inactive device later becomes active, providing the modifications are compatible as described further below. This process may be referred to as an extended merge operation. In addition, in some cases, a user of the inactive device, when the device is to become active, is prompted to determine whether to discard local changes to the base image or to merge them if possible.

FIG. 1 is an example block diagram overview of use of a Cloning and Synchronization System. FIG. 1 illustrates an environment 100 that shares a desktop image, represented as a CVD 101, among multiple heterogeneous endpoint devices 110, 120, 130, 140, and 150. CVD 101, the current desktop image, is typically stored centrally in a data center along with other CVD snapshots 170 that may represent the desktop at other points in time. CVD snapshots 170 may provide the ability to back up and/or restore the desktop to different endpoint devices as needed. As shown, user 160 is currently operating laptop 120 and thus laptop 120 is the "active" or master device. However, the user also has a need to work with the desktop on PC 110, on a mobile device 140 such as the user's smartphone, and on tablet 150. The mobile device 140 and tablet 150 are connected to one or more virtual machines 132 hosted by servers 130 accessed using a remote protocol such as RDP (Remote Desktop Protocol). When the user 160 makes changes to the user files 121 or OS data, registry settings, and the like 122, the files are transferred (e.g., forwarded, communicated, sent, etc.) using push operation 102 (e.g., upload operation) to the server stored CVD image 101. Copies of these files 111 and 131 are then transferred to the other endpoints using push operations 103 and 104 (e.g., download operations), respectively, from the CSS server (e.g., in the data center) to the CSS client residing in the PC 110 and the host 130. In this manner, the desktop image used by the PC 110 and the VM 132 are kept current (in "sync") with the changes to the desktop made by the user 160 on laptop device 120. The initial cloning of the CVD (desktop image) 101 to the endpoint devices is described with reference to FIGS. 2 and 3.

In some embodiments, as mentioned above, the CSS may allow changes to user content (such as user files and data) associated with the inactive devices such as PC 110 and the devices serviced by VM 132 (e.g., mobile device 140 and tablet 150) to be pushed to the server CVD image 101, using for example, push operations 105 and 106 (e.g., upload operations), in near real-time even when the devices are not active. Such behavior may be particularly beneficial when the user is simultaneously using multiple devices. Because this behavior may occur only in some instantiations of the CSS and is not mandatory to implement the one-to-many synchronization, the push operations 105 and 106 are shown using lighter weight dashed lines.

Figure 2:
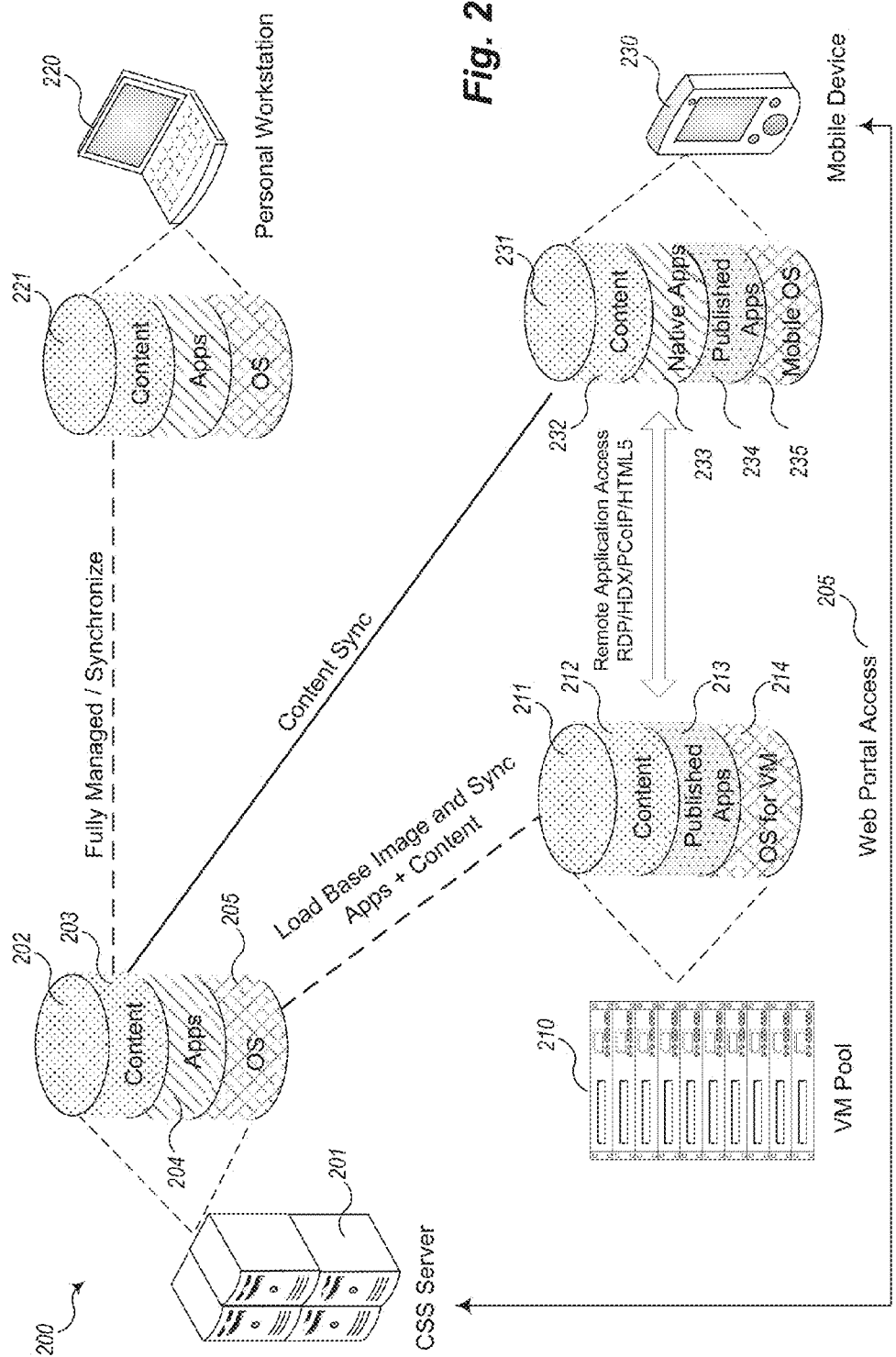
FIG. 2 is an example block diagram of an environment for using a Cloning and Synchronization System.

FIG. 2 is an example block diagram of some of the different types of cloning and synchronization that may be employed by a CSS. The CSS environment 200 shown includes a CSS server 201 and four different types of endpoint devices that wish to share CVD image 202 centrally stored on the CSS server 201. For the sake of example, the CVD 202 image has been provisioned for a Windows OS 205 and thus includes content specific to bringing up a user desktop on a Windows based system. CVD 202 is a logical representation of the user's personal desktop environment as stored offline in the CSS server 201 data repository (for example, in one or more storage devices).

CVD 221 is an instantiated, cached copy of CVD 202 after it has been cloned to personal laptop workstation 220. Of note, since the operating system for the PC is Windows based (the same as the reference CVD), the whole CVD 221 can be cloned from image CVD 202 except for hardware dependent aspects such as the drivers that support PC 220 and the machine ID information specific to device 220. Thereafter all layers of the CVD 221 may be synchronized with the server stored CVD 202.

CVD 211 is an instantiated, cached copy of a portion of the CVD 202 image associated with at least one virtual machine from VM pool 210. In particular, when the CVD 202 is cloned, a special base image (OS for VM 214), decoupled from the CVD 202, is instantiated specifically for a virtual machine so as not to interfere with system level software specific to VMs. Thereafter, only the applications and user content layers of CVD 211 is synchronized with the CVD 202 to preserve the tools specific to VMs.

CVD 231 represents a partial clone of CVD 202 restricted to solely user content 232, because CVD 231 is associated with a device 230 that does not share the same kind of operating system as the reference base image stored as part of CVD 202. Synchronization of the applications and OS from the CVD 202 may likely interfere with the operational capabilities of the device 230. Therefore, the applications of the CVD 202 cannot be cloned and executed on device 230. However, using device 230, a user can still access the Windows applications 213 of CVD 211 by connecting to a VM from VM Pool 210 that contains a clone of the CVD 202, which is capable of running Windows OS and apps. Using a remote application access protocol (such as RDP), device 230 can connect to 210 and gains access to the applications of CVD 211 (the clone of CVD 202). In this case, device 230 may access the full remote virtual machine, or may access specific applications using "application stubs" 234 that use similar remoting protocols to access specific applications in applications layer 213. The applications in applications layer 213 can also access the cloned user files 203 of CVD 202 (cloned as user files 212 of CVD 211). If device 230 only needs to access the user files 203 of the CVD 202, than it can do this in one of two ways: 1. read-only access to the user's CVD via a web portal access 205, which is a front end Web server that provides authenticated access to CVD files from any device that has a Web-browser. This web portal method is supported by the CSS server 201; or 2. synchronizing the file content 203 directly with device 230. In this case, there is no full synchronization but rather only user content synchronization between CVD 231 and CVD 202.

In some cases, a subset of the applications 204 that reside in the full image desktop stored in CVD 202 may be published to cloned devices such as a VM from VM pool 210 and stored in application layer 213 for use by endpoint devices, such as mobile device 230. When selected for publication by, for example, an administrator, only these applications may be made available to specific endpoints. A method for indicating such applications, such as an icon on the display screen of the endpoint device, may be presented to the user to enable the user to select the published application of the subset 234. Further, in some scenarios, published applications may be provided by a different endpoint device, uploaded to the server CVD 202 and published (transparently to the VMs in VM Pool 210) for use by other devices, such as mobile device 230. In the case illustrated, the published applications 234 are running on a VM from VM pool 210. Native applications 233 are those provided, for example, by a manufacturer or third party provider associated with the device 230. Note that when the desktop image 231 is synchronized, only user content 232 is uploaded to CVD 202 or downloaded from CVD 202.

Figure 3:
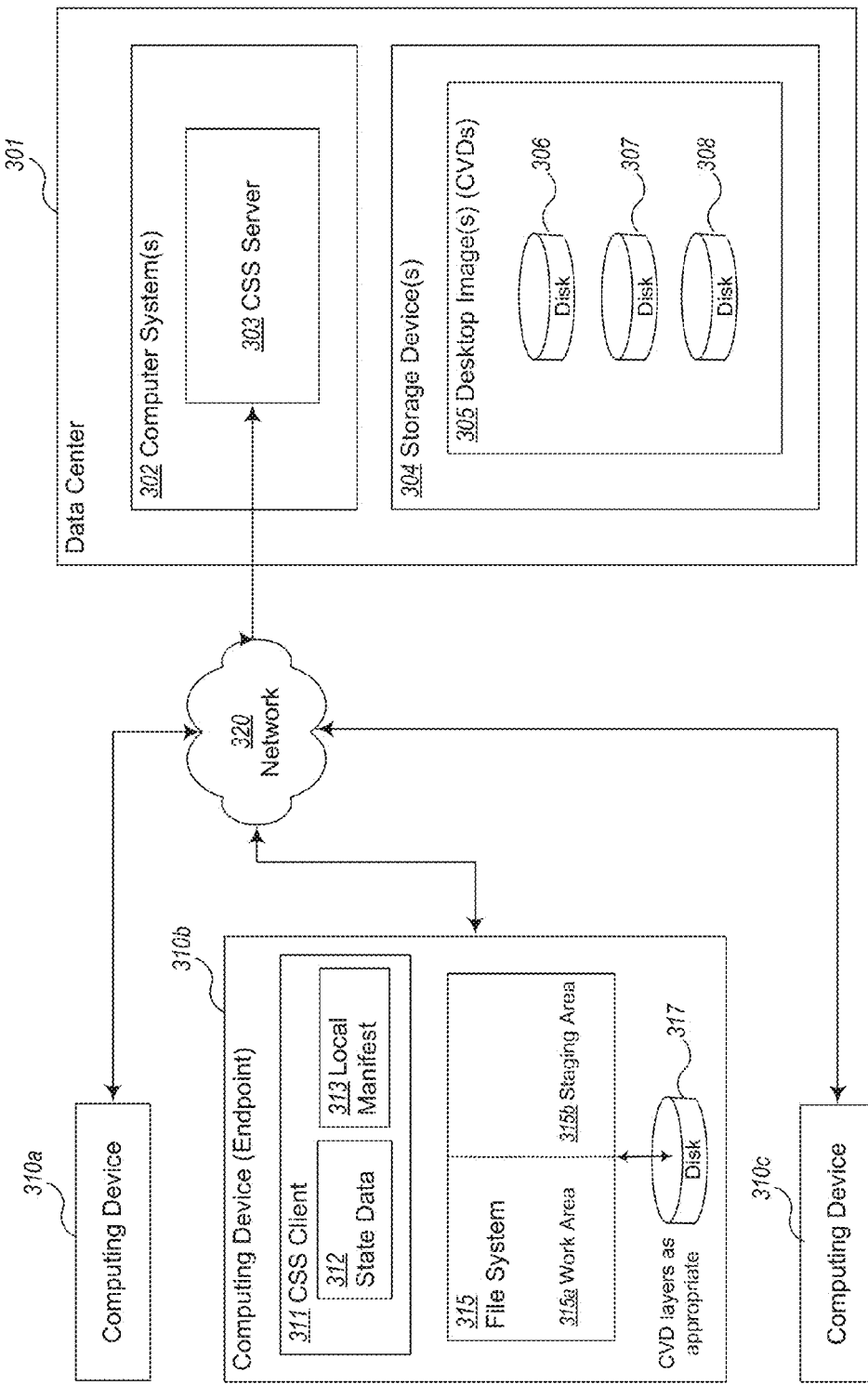
FIG. 3 is an example block diagram of the architecture of an example Cloning and Synchronization System according to example embodiments.

FIG. 3 is an example block diagram of the architecture of an example Cloning and Synchronization System according to example embodiments. In one embodiment, the CSS comprises one or more functional components/modules that work together to provide the cloning and synchronization described with reference to FIGS. 1 and 2. These components may be implemented in software or hardware or a combination of both. In FIG. 3, one or more computer systems 302 and one or more storage devices 304 are contained in data center 301, providing a central location for IT administration, and are connected through a network 320, for example, a WAN, LAN, or other communications medium, to one or more computing devices 310a-310c of a user to enable the user to perform tasks using a shared desktop image. These computing devices 310a-310c may be different types of hardware, such as the PC workstation, laptop and mobile devices shown in FIG. 1. Computing device 310b is shown in expanded view to illustrate generally the components that comprise the CSS on the client side that are present in each endpoint computing device 310a-310c.

At least one of the computer systems 302 in the data center executes a CSS server 303, which is communicatively coupled to one or more storage devices 304 that store and manage one or more CVD images 305 stored on disks 306-308. The CSS server 303 communicates with a CSS client, e.g., CSS client 311, located in each connected computing device 310a-310 to provide the cloning and synchronization capabilities. In particular, the CSS server 303 is responsible for transferring the CVD images 305 stored on the storage devices 304 to the endpoint devices 310a-c as appropriate. The CSS server 303 is also responsible for pushing down files corresponding to the parts of a CVD image 305 being synchronized (as explained further below) and for receiving files pushed up by the one or more computing devices 310a.

Each computing device, e.g., computing device 310b, executes a CSS client 311 (software, hardware, or a combination) which communicates with the CSS server 303 in a computer system 302 in the data center to receive cloned CVD images (or portions thereof), to receive pushed down files during synchronization, and to push up files to the CSS server 303 when the computing device 310b is the active device or at other times as appropriate. In one example embodiment, the CSS client 311 maintains state data 312 corresponding to items such as version information of various parts of the CVD and local manifest 313 which tracks the existence and state of files that are present on the computing device, including those received from the CSS server 303. In some embodiments, signatures of files are maintained using hash values to identify whether contents of files have changed. In addition, the file system 315 of each computing device maintains a working area 315a for files currently installed into the file system 315 and a staging area 315b for files in the process of being integrated, downloaded, or the like. The files referenced by the file system 315 are stored (can be read from and written to) in disk 317. These files comprise the layers of the CVD image that have been downloaded and integrated into the computing device 310b.

Example embodiments described herein provide applications, tools, data structures and other support to implement Cloning and Synchronization System to be used for sharing a user's desktop image among multiple endpoints. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like. Also, although certain terms are used primarily herein, other terms could be used interchangeably to yield equivalent embodiments and examples. In addition, terms may have alternate spellings which may or may not be explicitly mentioned, and all such variations of terms are intended to be included.

The CSS architecture exemplified by FIG. 3 enables a variety of use cases, including troubleshooting a user's device remotely without needing access to the device. Additional use cases supported by the multi-device synchronization model of the CSS include the following scenarios:

a. Physical to virtual (P2V) synchronization between a physical desktop or laptop and a fixed, always online, virtual machine (VM) for universal access (e.g., from a tablet computer).

b. P2V synchronization between physical desktop/laptop and an on-demand or temporary VM. This capability is useful for emergency access to the desktop and does not require an always online VM (which engenders associated costs), but rather requires the administrator, data center, or the like, to start a VM on demand and load it with a disk image of the VM, which is typically stored offline.

c. P2V centralized troubleshooting—helpdesk engineers or other professionals can clone a copy of the logical desktop image on a centralized virtual machine and troubleshoot the desktop, without requiring access to the user's remote physical machine. Once repaired, the changes can be synchronized with the physical copy on the user's remote physical machine.

d. Physical to Physical (P2P) synchronization between multiple physical machines, such as a laptop and a desktop. This synchronization could involve more than two machines, and encompass "N" clones.

e. P2V synchronization between a user's work desktop and a user's home VM. This allows a user to clone their work desktop at home using a virtual machine that is hosted on the user's personal machine and allows the user to run the personal and work machines at the same time.

f. User-files-only synchronization of selected directories. In this case, only the user content layer of the CVD is synchronized. The rest of the CVD layers are not synchronized. This mechanism can also be used in the cases in which the devices do not share the same operating system (e.g., a Mac OS device and a Windows device).

g. Sharing of user files across multiple users. The user can define permissions for other users to access the files from a shared directory, so that other users can access the shared files. This is similar to shares on file servers, with the additional benefit of keeping history of file versions and protecting the shared data, snapshots, automatic synchronization to a physical device for offline work, etc.

Cloning and Synchronization Operations

The CSS architecture accomplishes extending the CVD concept to bind multiple, potentially heterogeneous, devices using two new operations: Clone and Synchronize.

Clone (CVD, New Device)

The Clone operation takes a designated generic CVD object and clones it to a designated new device. Each CVD is bound to 1 or more endpoint devices. At the end of the Clone operation, the CVD adds (e.g., associates, identifies, designates, etc.) a new device into the group of bound devices managed by the designated CVD.

The Clone operation can be either end user-initiated or administrator-initiated. In the former case, the end user operates in a self-service operation. She introduces a new device, installs the cloning and synchronization client on it (the CSS client), provides her credentials, and then initiates a Clone operation on the CVD that represents her desktop. In the latter case, an administrator (such as an IT designee) invokes the operation on behalf of the end user.

Each device can belong to at most one CVD group, and a CVD group consists of N devices. Note, however, that the CVD is device-agnostic and decoupled from specific hardware. Device specific aspects are maintained in a device instance object.

In this context, the term "clone" refers to an image that is functionally identical but may be slightly different than the original. A clone comprises the same set of applications (both user-installed and centrally managed applications), data, and OS, but may have different installed drivers based on the underlying hardware of the designated device. A clone, as a distinct machine instance, will have a distinct identity such as a different machine identifier and network address, a different OS license number, etc.

As mentioned above, the CVD comprises multiple layers (components). Each layer is cloned in a specific way. In one example embodiment, the CVD comprises the following layers:

User files
User settings and profile information
Machine Identity (ID)
Application software, including user-installed applications
Operating system, including infrastructure and system level software (and potentially core applications)
Hardware-dependent software including device drivers and associated software.

Decoupling the CVD image into these layers is important for the success of the various cloning operations, since both the cloning and the synchronization logic are specific to the layer being cloned.

The general concept of cloning is operating system independent. Furthermore, a CVD can be shared by multiple devices with different operating systems, except that, in this case, synchronization is limited to user files and user settings. In order to accommodate different operating systems sharing the same CVD, user files are mapped properly in the directory trees and user settings are selectively converted as needed. For example, Web Browser favorites on a Microsoft Windows device are synchronized with their proper location on an Apple Computer Mac device.

USER FILES—User files are "cloned" by merging the user files of the CVD with the user files that exist on the designated target device. In effect, the Clone operation results in creating a (local) CVD that contains the union of all files from the server stored CVD and the new device. In case that there are conflicts between the CVD and the designated device, i.e., there are files with the same name and location but different content, a second copy of the conflicting file is generated (e.g., with a "copy" suffix or as a different version) and kept side by side, and a notification is presented to the user, which in turn may result in resolving the conflict by deleting one of the copies or keep both copies.

The mechanism for performing this merge is described in more detail with respect to synchronization of user content.

USER SETTINGS—By default, the CVD settings overwrite the settings on the target device and replace them. However, it is possible to define "partial" cloning that does not include user settings in the scope of the clone.

MACHINE ID—Machine ID settings of the CVD (which include machine name, IP address, OS license, etc.) are not mapped to the target device, i.e., the device preserves its own Machine ID. This is important to avoid network collisions that could arise from having two machines with the same name. However, some of these settings may be useful in a restore operation.

APPLICATIONS AND SYSTEM—By default, these layers of the CVD overwrite the target device. One process for performing in-place replacement of an OS and application sets is described in a U.S. Pat. No. 8,301,874. In overview, the new information is downloaded to the target device into a staging area. Special "pivot logic" is provided by the client software which is executed as the only process running during a first boot of the device. This pivot logic then performs an 'atomic switch' of the OS by moving files from the staging area into the working file system, and deleting files as necessary. When the initial pivot operations are complete, the pivot logic then performs a second boot of the device to finish moving or integrating components.

Note that at the end of the cloning process, the new set of system and application software is identical across all CVD clones, except for hardware-specific software.

HANDLING HARDWARE DEPENDENCIES—In order to cope with two devices that have different hardware, the CSS supports a driver library, which is decoupled from the rest of the image and contains a folder per hardware type with the relevant hardware-specific drivers. Upon performing the Clone operation, the CSS server automatically detects the type of the target hardware based on matching rules stored, for example, in the CSS server, and sends only the relevant driver folder along with the rest of the image. Automatic detection of the hardware type of the target endpoint enables the automation of the cloning and synchronization processes, so that they can be performed in a self-service manner by the end-users.

A driver library having folders of driver "packages" may be implemented for different operating systems using tools available for each operating system or a proprietary tool that arranges driver files into packages that can be installed. For example, for a Windows OS, a publicly available tool such as the Microsoft Deployment Toolkit allows a developer to put together a complete installation package for each driver. Some drivers use .inf files to install; other drivers require different methods for installation into the OS.

Alternatively, the CSS server may incorporate all driver software in a "fat" driver image (decoupled or not from the rest of the base image) and transfer the entire driver image portion during the cloning process. The CSS client would then need to recognize what drivers are needed and/or applicable to the new device and cause their installation into the cloned OS.

In another example embodiment, instead of the CSS recognizing what drivers are needed, the CSS triggers PnP (Plug and Play) and sets up everything for the OS to figure out which driver to use. If the proper driver is already installed in the target image, the CSS may not re-install the driver to avoid unnecessary installation.

Figure 4:
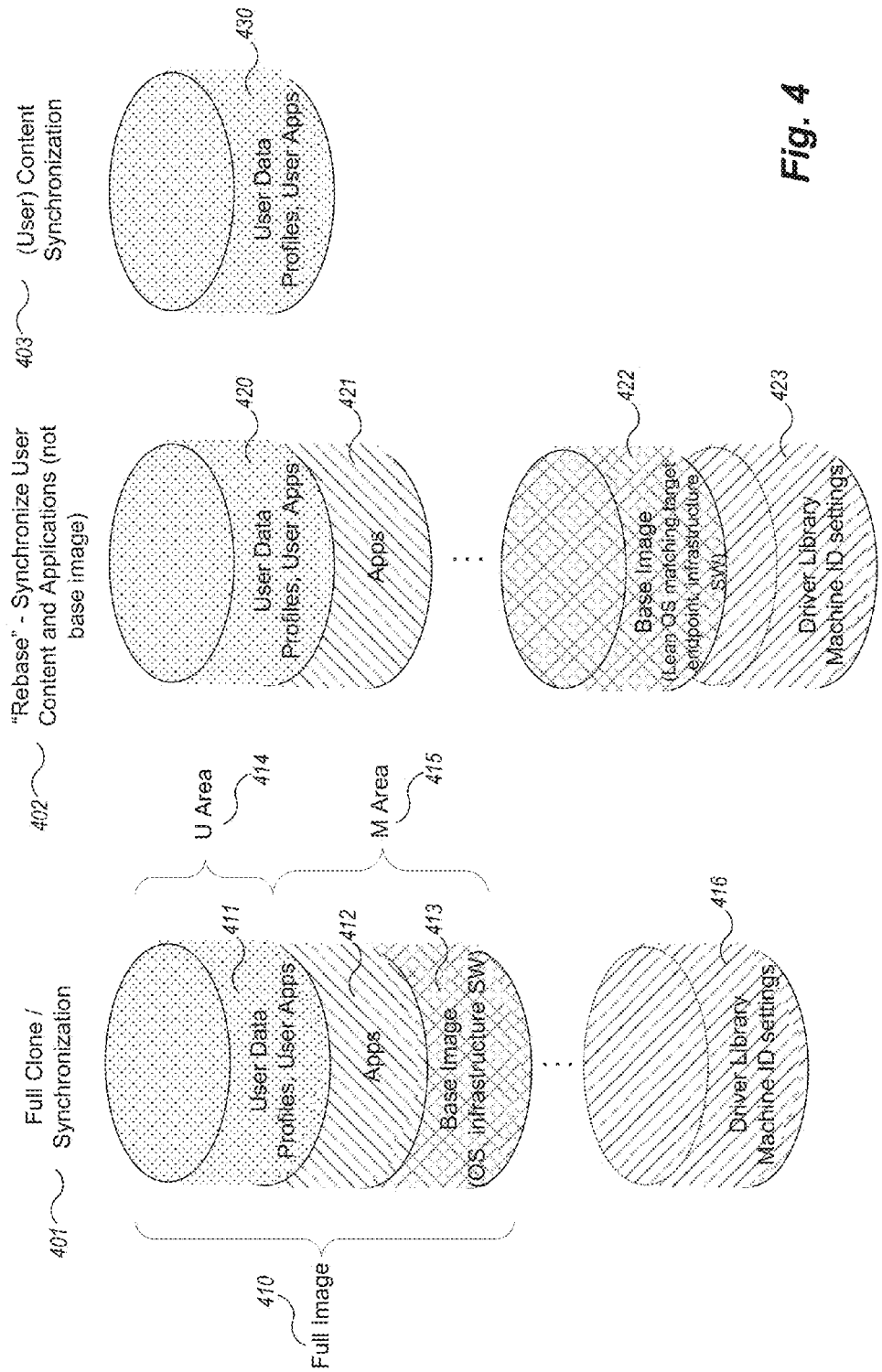
FIG. 4 is an example block diagram of how different CVD image layers can be used to clone and synchronize portions of a desktop to endpoint devices.

FIG. 4 is an example block diagram of how different CVD image layers can be used to clone and synchronize portions of a desktop to endpoint devices. Depending upon the circumstances, a full image may be cloned as detailed above (with the exception of handling hardware dependencies). This situation is illustrated in the full clone/synchronization scenario 401. Here, a full image containing user content (user data, profiles, user installed applications) 411, IT supplied applications 412, and a base image 413 (OS, infrastructure software, etc.) is cloned onto a new device. (A restore operation to a target device is performed similar to the clone.) The driver library 416 containing the drivers needed for the new device is shown decoupled from the rest of the full image 410 since, once installed, it is not synchronized.

In some cases, it may be desired to decouple not just the hardware layer but also the OS layer from the rest of the system, and only clone the application layer that is above the base OS layer. For instance, there may be some low-level software that is only applicable to the device but is not identifiable as hardware specific or driver-based, and hence should reside only with the new/target device. An example is "virtual machine tools," a common set of applications needed to operate well with virtual machines—and should not be removed when an image is cloned from a physical device onto a virtual target device, and similarly should not be applied when cloning from virtual to physical device.

For these cases the CSS provides partial clone/restore illustrated as "rebase" scenario 402. Here, the user content (user data, profiles, user installed applications) 420 and IT supplied applications 421 are cloned (or restored) onto a new/target device. Specifically, the CSS allows an administrator to define a "base image," 422, which includes a lean operating system image that matches the new device and is decoupled from the rest of the image. In addition to OS image, the base image 422 may contain low-level system software that should not be removed (for example, when restored) or cloned. Using this method, a new/target device is initialized with a base layer that is applied to it, before it can be used for multi-device synchronization purposes. Once the base image 422 is applied, the CSS cloning logic only clones the layers above the base layer (e.g., user content 420 and applications 421), which are then merged with the target base layer (instead of overwriting the system layer, as done in full system cloning). An example of this type of cloning is also illustrated with respect to the CVD 211 for the VM pool in FIG. 2. Using this method, the CSS can clone an image from one hardware platform to a significantly different hardware platform by replacing the based image in the CVD from one that matches the first hardware platform (e.g., a VM) to another which matches the second hardware platform (e.g., a laptop). This effectively clones all of the applications, data, and settings in the image, except the OS and hardware-related software, which is replaced with the one corresponding to the target device.

Base images, including lean OS base images may be formed for use with the CSS by setting up a reference machine where the OS for the target hardware is installed (or an otherwise clean image can be found) with as few or as many components as desired, installing the CSS client, and then capturing and storing the resultant base image. Base images may be updated in a similar fashion.

Replacing a base layer (in the case of a Windows OS based CVD) can be performed by smart merging (or extended merging) of the file system, the registry, and several in-file/database objects specific to Windows. Smart merging may be performed as well when synchronizing an inactive device to become an active device when it is not desirable to completely discard local changes to the applications layer, OS and infrastructure layer, and even the device driver library. Smart merging may require updating, deleting, downgrading of DLLs and applications, sharing of existing resources, updating the Windows registry, etc. Merging drivers is handled similarly. Some changes are first downloaded or integrated into a staging area, such as staging area 315b in FIG. 3, especially if a reboot is required and pivot logic is used to replace portions of the local desktop image.

In some embodiments, a snapshot image, for example, using Windows VSS utility, is used to assist in the merging process.

When cloning content of a device D1 with a base layer BI1, onto another device, D2 that has its own base layer BI2, the following logic is applied:

The CSS client in D2 downloads a manifest of all the files in D1 and the system registry hives of D1 from the CSS server, including the manifest and registry hives of BI1 and BI2.

The downloaded file manifest and registry hives of D2 are modified to create a "merged image" (merged file manifest), as follows:

Entries which exist in BI1 and don't exist in BI2 are removed.

Entries which exist in BI2 are added on top of existing entries, except for specific entries which can be defined by policy.

At this point, the merged file manifest contains all of the content of D1, but with a base layer BI2 instead of BI1.

The local file system of D2 is scanned using a VSS snapshot created on D2, creating a local manifest of the files in D2.

The CSS client in D2 calculates the delta of the merged file manifest and the local manifest, creating the "delta manifest."

The CSS client in D2 downloads files which aren't yet available in D2 but are in the delta manifest into the staging area, which is a dedicated protected directory. The merged registry hives are also put into the staging area as computed by special registry hive merge shims.

The CSS client also performs specific merge operations before booting D2. These operations are implemented by "shims" and are responsible for merging Windows-specific databases and handling application conflicts.

The CSS client then instructs the machine to boot and runs a boot-time CSS application (a "pivot" operation) to move files and merged registry hives from the staging area into place, arranging the local file system of D2 to contain the calculated merged image which has BI2.

After boot, the CSS client may complete merge operations by running post-boot "shims", merging any additional Windows databases in an online manner.

As mentioned above, in some cases, special additional logic can be employed through the use of "shims." A shim is a code handler containing logic/instructions that are executed before and after defined events in the running system. Shims are associated with different hooks into the system and executed upon the occurrence of certain CSS events, such as upon startup, pre-upload, pre-pivot boot, etc. Active shims are configured via policy (e.g., an IT administrator defined policy file or definitions) and can be dynamically loaded into the running system. They can be used to help merge updates to a base image, special handling for loading drivers and the like, and migration to different operating system versions, etc. Shims also can handle merging two different operating systems versions, which may involve more than just a simple merge of the file system and the registry.

For example, in one example embodiment, when using Windows, a software shim is executed to add and remove application programs and update the registry properly. More specifically, Windows keeps a list of installed applications in the registry. If the synchronization operation currently being performed is to replace an existing application with a newer version, then special handling is required because merging a new registry entry by simply adding a new key will result in multiple versions of the same program instead of replacing one version of the application with an updated version. To resolve this problem, a CSS shim is hooked into the "pre-boot" event so that the CSS can, in the staging area, perform a naïve merge and then clean up the two application versions before the device reboot takes place. If there is a conflict, the original base image contents will prevail.

As other examples, a shim can be used to update application license-related registry keys or provide special CSS registry values in the Windows registry, merge OEM supplied drivers by pre-loading them into a special folder controlled by the CSS, download the entire CSS driver store when desired (without upsetting the already installed drivers in the local base image), install/merge network components into the registry using Window's APIs at the relevant time in the boot process, and the like.

The following is a list of major merge mechanisms used by a CSS client to properly merge two Windows instances and the included applications:

A shim for merging the Windows driver store.
A shim for merging Windows network components (for firewalls, VPNs, . . . ).
A shim for merging and de-duplicating the add/remove program database.
A shim for merging the WMI repository.
A shim for handling application-specific licenses (e.g. Office 2010).
A shim for merging the Windows side-by-side database.
A shim for merging Microsoft's help database.
Non-naïve registry merge of selected registry values.
Logic for extracting hardware-specific identifiers from a Windows machine (mainly policy-based).
Logic for filtering temporary and log data from a Windows machine (mainly policy-based).
Logic for selecting the highest version of PE (Portable Executable format) files (e.g., DLLs) when they conflict.
Logic for preserving PE files which are needed by user-installed applications.
Logic for avoiding the overwrite of user settings and data when merging Windows machines.
A reporting tool for detecting and avoiding application conflicts both at the application level and at the module level (e.g., DLLs).

In some cases, for example where the operating system and applications of the new/target device are completely different than the lean OS base images created for rebasing, the CSS may provide no clone but only synchronization of user content as described with respect to CVD 231 in FIG. 2. For these cases, the CSS provides the user content synchronization scenario 403, which synchronizes only user content 430. There is no need for a clone per se, because the first synchronization of the user content will merge user content stored in the server CVD with any user content already present on the device. Alternatively, a clone of the user content layers could be performed as specified above where the user files of the CVD are merged with the user files that exist on the designated target device.

In some cases, it is possible to leverage the CVD layering architecture in order to quickly provision a new VM from a template base image provided by the CSS. The template base image can be pushed down to and maintained by the VM infrastructure as a "linked-clone," which enables the virtualization infrastructure to spin an image to a new VM very quickly, with minimal use of storage resources. That is only one copy of the base image is maintained for a group of VMs. The CSS can then overlay the base image that is cloned using the linked-clone capabilities with the upper layers of the CVD, which are cloned using the CSS mechanism, including applications and potentially user content.

Synchronize

Once a device is cloned, the CSS is thereafter responsible for maintaining the synchronization of all N clones using one or more synchronize operations such as "Sync Up" or "Sync Down." In various embodiments, the system supports continuous transparent full machine/full profile bi-directional synchronization. Here, bi-directional refers to the notion that updates to the server CVD can be caused by pushed updates of active device or by updates to the server CVD from another device or the CSS server.

For the purposes of an example embodiment, the following factors are presumed:

The user typically works with one device at a time, although may occasionally use multiple devices in parallel (e.g., desktop and a smartphone).

Each user has a handful of devices.

The transition between active devices is expected to occur a few times a day at most.

It is not possible to require end users to notify the system when they are "done" with a device.

The synchronization method cannot assume that all devices sharing a CVD are always connected. For example, a laptop may be taken offline before completing its synchronization. Here connected refers to a connection to the CSS server—not whether it is "online," for example communicating with the Internet.

When a user switches to a new device from the same clone-set (devices bound to the same CVD), the user should be able to start working with it quickly with minimum delay.

Taking these considerations into account, an example CSS synchronization method works as follows:

At any point in time, one device from the CVD device group is denoted as the "active" or "master" device. A device becomes active by the CSS assigning the active role to the device, once the CSS detects that a user is actively working on that device. The CSS can detect that the user is actively working by detecting (e.g., identifying, determining, monitoring, etc.) interaction including mouse movement and keyboard activity. Other methods, such as detecting a login and using heuristics regarding the device hardware type may also be employed. The CSS client can monitor such activity on a frequent or periodic basis, and even continuously. In some embodiments, a certain threshold of time needs to pass before switching to a new device to avoid thrashing back and forth the active role between devices. In one embodiment, a device having the active role is the only device that is allowed to upload changes (from any layer) to the server CVD. According to this embodiment, the active device, through the CSS client, performs periodic uploads of local changes made in the device to the server CVD.

An inactive device (a device that has not been assigned the active role) is not performing updates to the server copy of the CVD, but if it is online, it receives updates made by the active device through its CSS client. This proactive push of updates reduces the time it takes for an inactive device to become active and fully updated. The CSS blocks an inactive device from performing "system-level" (base image, application layer, etc.) changes locally, such as installing new applications, updating the operating system, etc. This restriction is acceptable since the example embodiment assumed that only one device is being actively used by the user. However, an inactive device may still update user files and data locally on the device, in which case the CSS has to be able to cope with multiple devices performing changes to user files, although they do not perform simultaneous updates to the server copy according to this embodiment. Rather, the local updates are merged with the server CVD when the inactive device later becomes active. Updates pushed down from the server CVD are merged, as described below, to preserve both local changes and changes made by other devices.

In another embodiment, inactive devices can perform periodic updates of local changes made only to the user content at the same time as the active device performs updates to content and other devices perform updates to user content. This latter arrangement is useful in embodiments that assume more than one device can be used simultaneously. However, the CSS server needs to synchronize the updates to the server CVD by performing them, for example, in a sequentially preserved order, by using a locking mechanism, or some other feature. This complexity is not necessary when only the active device (or CSS server) can push updates to the server CVD.

In an example embodiment, the following synchronization logic is applied by the CSS:

In a steady state, where a device D2 is the active device, the CSS client on D2 periodically checks whether D2 has conducted an update and uploads the delta (the files that have changed) to the server copy of the CVD by communicating with the CSS server. Note that the CSS client may employ a different upload frequency for user files versus system files (e.g., user files may be subject to a "sync now" policy, whereas application/system files may be updated on a periodic base). Also note that for application/system files, a point in time snapshot (e.g., a VSS snapshot) is typically taken to ensure consistency, whereas for user files there is no need for snapshot (the user files are merged as described below)). If another device in the device group bound to the CVD, for example D1, is on-line, then D1 would periodically check if the content on the server CVD is newer than the version it has, and, if so, would trigger a sync down operation if so. As described below, the sync down operation may work differently for different layers.

As an example, assume that the user is approaching device D1 and wants to work with it. Previously the user was working on device D2, which was therefore marked as the active device. At this moment the CSS client running on D1 detects user interaction on D1 and wants to switch the active role to D1. The following steps are performed by the CSS:

1. Upload a snapshot of D1. This step ensures that D1 can be restored to its state prior to the synchronization operation in case the synchronization causes an undesirable outcome.
2. Sync up of D2: If the previously active device, D2, is connected, then D2 synchronizes all pending changes with the server copy of the CVD (e.g., the CSS client on D2 performs a sync up). Note that in many cases the D2 device CVD is already synchronized up to the server CVD due to the periodic updates that an active device performs against the CVD. Also, note that the CSS uses data de-duplication methods to expedite the check for and transfer of updates, and uses system level indicators to identify if new applications have been installed. Finally, note that the upload by D2 creates a new snapshot of the CVD, hence not colliding with the upload made by D1, which is used for recovery purposes.
3. Sync down of D1: D1 downloads the delta updates from the server CVD. The delta updates refer to the files that have changed.

While performing a sync up, the CSS can employ techniques to optimize the transfer of data over the network. For example, the following techniques can be used:

Sync Up—
1. Endpoint device (CSS client running thereon) captures system state and identifies potential modifications and places them into Delta1,
2. Endpoint device (CSS client running thereon) calculates the signatures for the potential modifications, compares them to current CVD signatures and identifies changed files and places them into Delta2.
3. For each unique file F in Delta2:
   a. Check if file F was already synchronized by this or other endpoints b1. If yes—skip sync up, create logical reference on CSS server
b2. If no—for each block B of file F:
Check if block B was already synchronized by this or other endpoints (e.g., as a part of other files).
If yes—skip sync up for specific block, copy data locally on CSS server.
If no—transfer block data
4. Endpoint device (CSS client running thereon) completes the sync up and stores the changed files as new version of CVD.

Sync Down—
1. Endpoint device (CSS client running thereon) captures system state and identifies potential modifications and places them into Delta1.
2. Endpoint device (CSS client running thereon) calculates the signatures for the potential modifications, compares them to current CVD signatures and identifies changed files and places them into Delta2.
3. Endpoint device (CSS client running thereon) requests from the CSS server the list of concurrent modifications that were performed on CVD since last sync point.
4. Endpoint device (CSS client running thereon) calculates which files and versions "win" according to conflict resolution table described in Table 1 and places them into Delta3.
5. For each unique file F in Delta3:
a. Check if file F was already synchronized by this endpoint
b1. If yes—skip sync down, copy data locally
b2. If no—for each block B of file F:
Check if block B was already synchronized by this endpoint (e.g. as a part of other files)
If yes—skip sync down for specific block, copy data locally
If no—transfer block data.
6. Endpoint device (CSS client running thereon) completes the sync down and reboots if required.

Note that the sync up and sync down operations may contain updates to any of the CVD layers or elements, including user files, user settings, and system & applications. However, while the download is performed for all layers, the actual operations of synchronizing the changes with the running system are not performed on every sync operation, as the system distinguishes between user files changes and system/application level changes. System/application level changes may be performed on a delayed basis; while user content level changes may be integrated in near real-time.

In particular, the CSS performs the following synchronizations for the various types of files:

Live sync of user files—The CSS performs a "live sync" of user files. That is, the files are merged following the same method as for the clone operation. The merger of user files is described with reference to Table 1.

Lazy sync of user settings—This synchronization operation requires a "user log-off/log-on" sequence in order to apply the changes on the endpoint device. Hence, the synchronization operation does not wait for the user settings to take place, in order to reduce the wait time and disruption to the end user. At a later point, if user settings have been changed, the user may be asked to optionally log off and log on in order to apply the new user settings, such as through a user interface control such as a dialog box, balloon, pop-up window, etc. As with the case of cloning user-settings, the synchronization of user settings may involve overwriting the settings of inactive devices with the settings of the new active device or may involve a smart merge operation.

Lazy sync of system and application changes—This synchronization operation requires a restart of the device. As such, this operation is also deferred. The user can continue to work and at some point is prompted to restart the system in order to apply the system changes, if such changes occurred. Note that upon restart, the device contains the updated copy of the image, which might be different than the previous image. In particular, while the user content sync merges changes, in some embodiments, system and application sync may overwrite the existing local copy as described with respect to the clone operation. For example, in the case of a full restore, all layers except the driver layer are overwritten, and in the case of application level restore (a rebase operation), the driver library and the base-image (OS) layer are preserved, while all applications are overwritten. In other embodiments, a system and application sync may determine whether or not to overwrite the local copy or perform a smart merge to the extent possible.

In order to eliminate unnecessary synchronization at the system level if no changes to system provided applications (and the operating system, in the case of full restore) have occurred, the CSS checks to see if the application lists on the source (server CVD) and target devices are identical, in which case it does not perform system level synchronization at all. This heuristic prevents the CSS from conducting an unnecessary synchronization for each change in the system files.

No sync of hardware dependent elements, or of machine identifiers

Previous active device not synced up—Techniques are provided to address the case where the previous Active device (D2 in this example) went offline before performing its latest sync up operation. In this case, there is a risk that changes made to the system might be lost if incompatible with changes made since to the system by D1. However, since the first step in the protocol involves uploading a snapshot of D1 (the previously active device), the user can revert back the changes that were made to the system by D1, if so desired.

Live synchronization of user files for both cloning and synchronization operations is performed by merging the local files relating to user content with changed user files noted for the server CVD. In one embodiment, the changed user files are determined by the CSS by computing the difference (the "delta") between the area of the server CVD image denoting user content and the area of the local CVD image denoting user content. The area of a CVD image denoting user content is referred to as the "U area" and is shown as U area 414 in FIG. 4. (The M area—or machine area—is the entire CVD image minus the U area, which is shown as M area 415 in FIG. 4.) A "manifest"—or list of files—is maintained for the server CVD and for each local CVD. In addition, a last uploaded manifest is kept by the CSS client. For live synchronization, the delta for consideration is the difference between the server CVD manifest and the local manifest with respect to the U Area.

The CSS client on each device tracks the current version of the local M area and the current version of the local U area in, for example, state data 312 in FIG. 3. The CSS server maintains a single version for the entire CVD image. However, in some embodiments, the CSS server maintains separate version numbers for user content versus the rest of the image. On inactive devices, a live merge operation is invoked when the local U version is lower (older) than the CSS server's CVD version. On active devices, a live merge operation is invoked when the only difference between the list of files for the server CVD and the local CVD involves files in the U area (e.g., no changes have been made to the M area).

According to one implementation, after the U area delta has been determined, the files designated by the U area delta are downloaded by the CSS client to a staging area of the local device (e.g., staging area 315b of FIG. 3). The files are typically download in a prioritized order (e.g., according to a streaming priorities mechanism such as that described in U.S. Pat. No. 8,301,874 or other priorities mechanism). The signature of each of these files (from the CSS server's CVD manifest) is then compared to the signature of the corresponding file (if one exists) in the local manifest and to the signature of the corresponding file (if one exists) in the last manifest that was uploaded by this device to determine the disposition of the file (per file action) according to Table 1. The signature of a file may be computed using any known mechanism, for example, to compute a unique hash value representative of the content. In overview, the dispositions addressed by Table 1 insure that 2 files that are different co-exist side-by-side in the resulting merged U area. The determination of each file is typically performed immediately after downloading the file, however, such can be done at different times as well. Once the files in the staging area are merged, the CSS client updates the version of the local U area to be equal to the server CVD version.

for each file. In other embodiments, the "last modified" timestamp of a file is used instead of a file signature to determine whether it has been changed. Also, in some embodiments, other activities such as base image updates may be temporarily disallowed while performing the merge. Also, if two (or more) devices are making changes to a same file, it may become important to set a limit to the number of times the file is duplicated and saved with a new name.

In some embodiments, near continuous updates from multiple (inactive) devices to the server CVD are supported for user data. That is, inactive devices as well as active devices are permitted to update user content of the server CVD without needing to be designated the active design. This design is demonstrated by operations 105 and 106 shown in FIG. 1. In this scenario, when the CSS detects that two devices are trying to upload at the same time, it might choose to reject one of them. The rejected device will eventually detect that the server CVD version is higher than the local version and will perform a live sync action (and U area merge) of the user content.

The synchronization of system and application changes to inactive devices, typically with use of a lazy sync operation, occurs when the current version of the M area stored for the local CVD, for example, in state data area 312, is lower (older) than the server CVD version. In addition, in some embodiments the CSS client detects that significant changes have occurred, before engaging in this synchronization

TABLE 1

| Local | Last Upload | Server | Case Description | CSS Action |
|---|---|---|---|---|
| 0 | 0 | 1 | File added by another device, doesn't exist locally | Move downloaded file into place |
| 0 | 1 | 0 | File deleted by another device, doesn't exist locally | No action |
| 0 | 1 | 2 | Locally deleted file was modified by another device | Move downloaded file into place |
| 1 | 0 | 1 | Recreated file is same | No action (don't download file) |
| 1 | 0 | 2 | Recreated file is different | Move downloaded file into place with unique name (e.g. "Conflicted . . . ") |
| 1 | 1 | 0 | Another device deletes file | Delete local file |
| 1 | 1 | 2 | Another device modifies file | Move downloaded file into place (overwrite local file) |
| 1 | 2 | 0 | Locally modified file was deleted by another device | No action (possibly notify) |
| 1 | 2 | 1 | Locally modified file was modified in the same way by another device | No action |
| 1 | 2 | 3 | Locally modified file was modified differently by another device | Move downloaded file into place with unique name (e.g., "Conflicted . . . ") |

In Table 1, the "Local" column refers to the signature of the file identified by the local manifest. The "Last Uploaded" column refers to the signature of the file identified by the last manifest that was uploaded by this device to the CSS server. The "Server" column refers to the signature of the file identified by the CSS server's CVD manifest. A "0" entry means that the file does not exist. A "1," "2," or "3," entry designates different signatures in the abstract.

In some embodiments, native snapshots supported by the native operating system of a device may be used to aid in the determination of what to download (the delta). For example, the VSS tool may be used for this purpose in Windows. Also, in some embodiments, instead of preloading the staging area with all of the user files in the delta and then processing them one by one, the signature of each file may be checked for disposition and then a separate download request generated process. For example, the CSS client may determine that the list of applications in the server CVD is different that the local CVD application list and the pending application list (those changes stored in a staged area but not yet integrated). As other examples, the CSS client may determine that a significant amount of registry user settings have changed, user profiles were added or removed, an IT administrator is requesting this sync operation, this is the first time the M area on the local CVD is being updated, etc.

This synchronization operation (sync down of the M area) may be performed by conducting a system-only restore of the M area to the staging area, such as staging area 315b of FIG. 3. This restore operation will take into account and integrate any files previously loaded into the staging area but not yet integrated into the system. Once the download is completed, the CSS client will notify the user that an update is available. For example, the CSS client may cause a user interface control such as a dialog box, pop-up window, text message, or the like to be presented to the user. The user is then free to either restart (reboot) the system and apply the changes or ignore them. The CSS client then returns to its main event loop and examines the CVD info to decide on a next action. In some embodiments, a time period for rebooting is employed to enforce a latest update when a large amount of time has passed.

As an alternative to using a system-only restore of the M area, the CSS may choose to perform a smart merge of the device content, such as, for example, using the shims discussed above. For example, when updating the inactive client with a new CVD version, it may be desirable to merge local changes with the updates provided by the CSS server. These smart merges can be performed using the shims described earlier so that local changes need not be lost. For example, the "add/remove program shim" may be invoked to perform a smart merge of applications that are different versions of the same application, by updating registry values appropriately, etc. In addition, it may be desirable to query the user as to whether the user would prefer the master changes to override (the changes currently being downloaded from the Server CVD) or whether to attempt a smart merge. This inquiry may be performed, for example, through a user interface control such as a dialog box, balloon, pop-up window, etc. Shims are available for performing a smart merge of many portions of the OS, infrastructure, managed application layers of the CVD, and drivers, including those mentioned above (e.g., COM, registry hives, .net, and the like).

Figure 6:
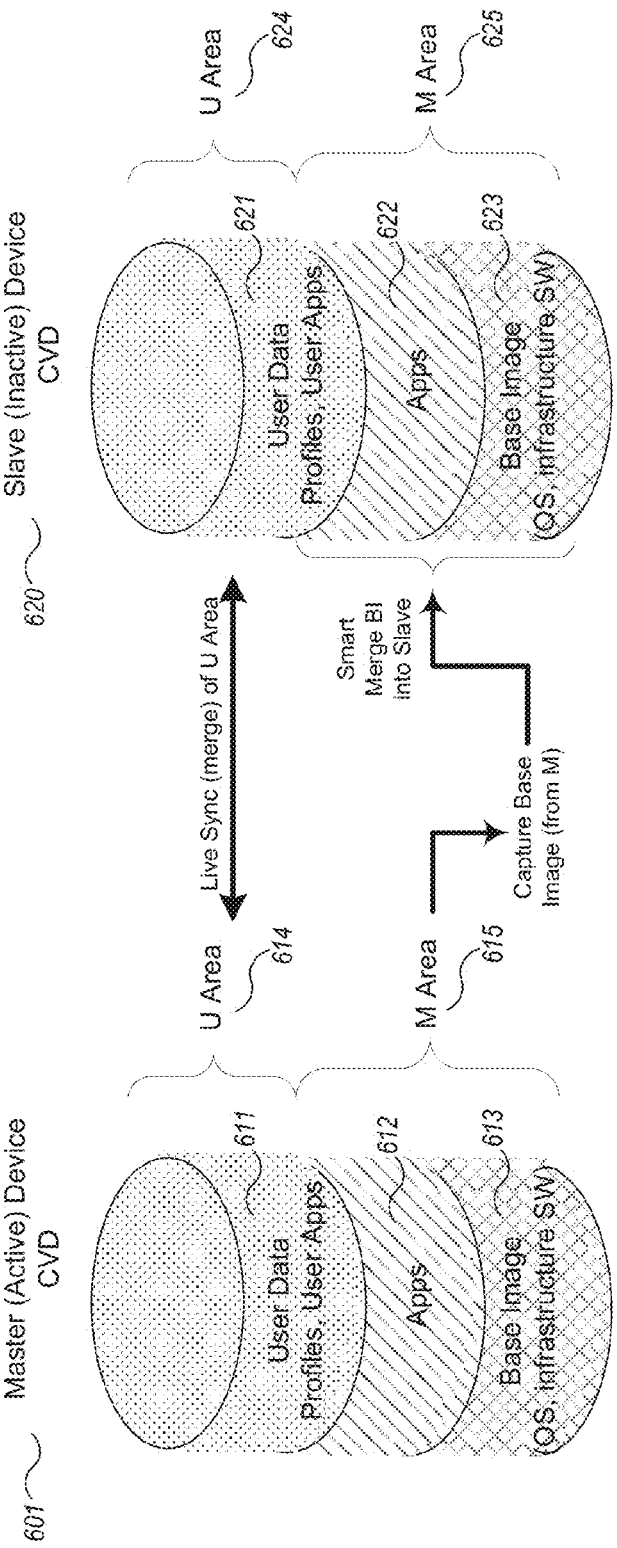
FIG. 6 is an example block diagram of a smart merge of the machine layers of a first device to a second device.

FIG. 6 is an example block diagram of a smart merge of the machine layers of a first device to a second device. Such actions may occur as stated, for example, when performing a sync down operation to an inactive device in order to make it the currently active device. For example, FIG. 6 illustrates a smart merge from an active device (master) 601 to an inactive (slave) device 620. The U area 614 of the master CVD 601 is merged though live sync operations to U area 624 of slave CVD 602. As described above, the M area 615 is merged by creating a base image and then merging that base image into the slave CVD 620. For example, if there are 2 different applications, app 1 on CVD 601 and app 2 on CVD 620 then the merged applications layer will contain both applications with appropriate adjustments to the system registry hive. Similarly if there are 2 different versions of the same application, then one of the versions will need to "override" the other—the most recent version make be the winner, the version in the captured base image, or the user may be prompted, etc. In addition, policies may be available that dictate what files are not to be included in an image (e.g., unprotected files that are not touched or specific files and/or directories that are not to be made part of the sync down), what registry keys and values shouldn't be merged, and the like.

Alternatively, when two or more devices are being used simultaneously by the user, the CSS may decide that a simple deployment of lightweight user content synchronization using the live merge of the U area described above makes more sense than keeping the rest of the CVD layers synchronized. In such a case, the CSS need not differentiate between active and inactive devices.

Also, in the process of cloning and/or synchronizing CVDs, the CSS may detect that a device has insufficient disk space to store the contents of a copy of the server CVD. In such a case, the CSS may support a cache-mode capability which enables an endpoint to operate with only a fraction of the image resident (up to the size of the disk of the target device) and "leave behind" some of the content. If the user needs to access content that is not resident, the CSS fetches that content on-demand from the server copy of the CVD, and evicts from the endpoint device files that have not been accessed recently. The eviction may involve deletion of the file from the file system and replacing it with an "offline" file, which keeps a stub for the file in the file system but does not actually store the file contents. When a user makes a request to access a file that is offline, the system intercepts the request and fetches the file on-demand from the server.

In order to expedite cloning and synchronization operations, the CSS supports the ability to stream some of the content on demand, rather than having to synchronize all content in advance before completing the synchronization. This is particularly important for cloning and synchronization of user content, since the amount of synchronized content can be very large although large portions of the content are rarely accessed by the users. Hence, by keeping a profile of the more commonly used files as part of a CVD profile, the CSS can determine a small "working set" of commonly used files, and stream only them for the new (or synchronized) device. This method will promote a faster completion of the cloning and synchronization operations. Once the working set is synchronized, the rest of the files can be delivered to the new/updated device on demand or in the background.

Computing Devices for Implementing a CSS

The techniques described herein for cloning and synchronization can be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
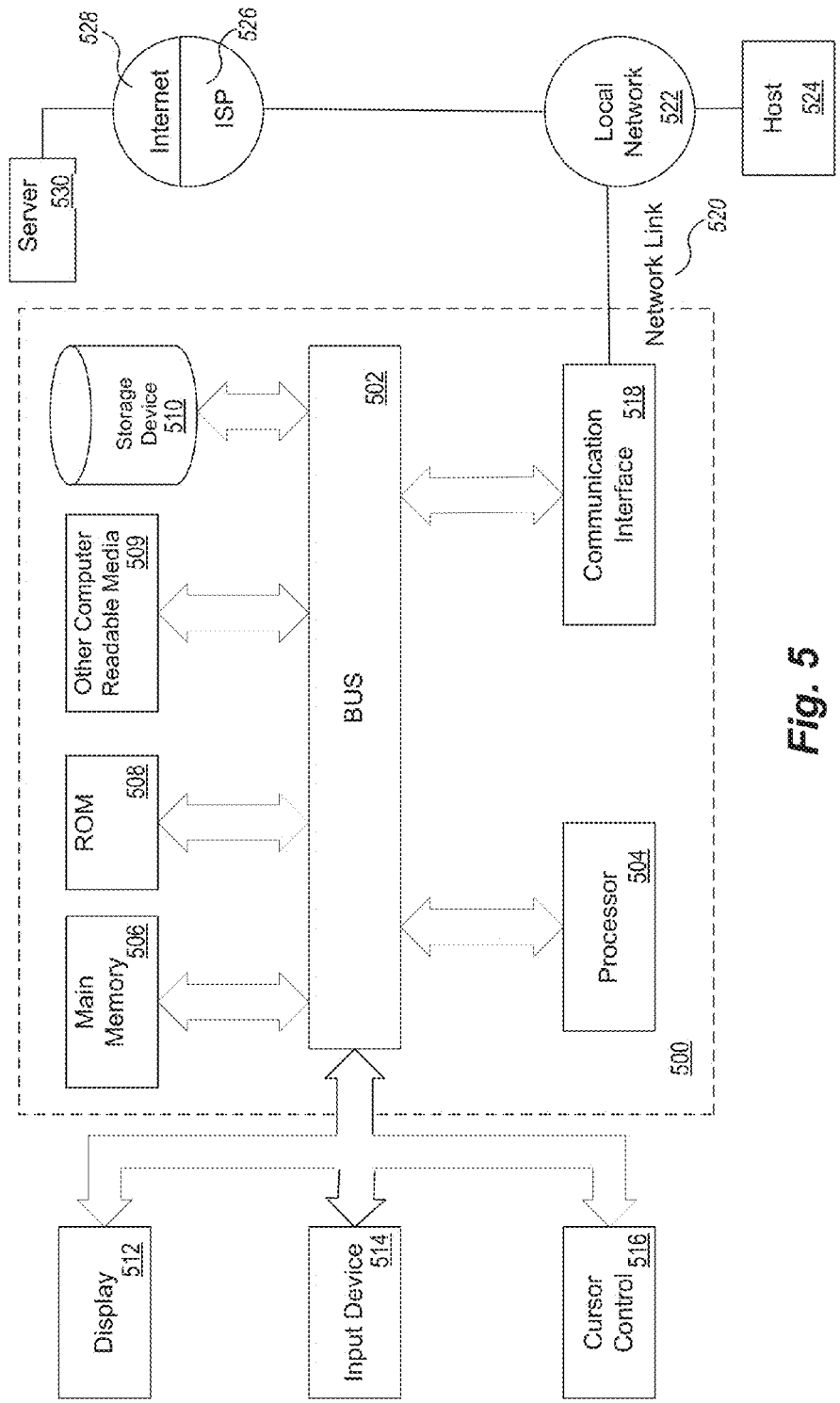
FIG. 5 is an example block diagram of a computing system for practicing embodiments of a Cloning and Synchronization System.

FIG. 5 is an example block diagram of a computing system for practicing embodiments of a Cloning and Synchronization System. Computing system 500 may comprise one or more server and/or client computing systems and may span distributed locations. In addition, each block shown may represent one or more such blocks as appropriate to a specific embodiment or may be combined with other blocks. Moreover, the various blocks of the CSS may physically reside on one or more machines, which use standard (e.g., TCP/IP) or proprietary interprocess communication mechanisms to communicate with each other.

Computing system (or computer system) 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510 or other computer readable media 509. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

From the foregoing it will be appreciated that, although specific embodiments have been described herein for purposes of illustration, various modifications may be made without deviating from the spirit and scope of the present disclosure. For example, the methods and systems for performing cloning and synchronization discussed herein are applicable to other architectures other than a Windows architecture. Also, the methods and systems discussed herein are applicable to differing protocols, communication media (optical, wireless, cable, etc.) and devices (such as wireless handsets, electronic organizers, personal digital assistants, portable email machines, game machines, pagers, tablets, mobile devices, and navigation devices such as GPS receivers, etc.).

The headers contained herein are for organizational purposes only and are not intended to limit the present disclosure in any way.

The invention claimed is:

1. A computer-implemented method in a server computing system for synchronizing a user desktop image across multiple computing devices connected via a network, comprising:

creating and storing an N-to-1 mapping in which multiple distinct computing devices are bound in a group to a single centralized virtual desktop (CVD) data object stored and maintained by the server, wherein the CVD data object defines one or more layers that include user files, user profile and settings, application software, an operating system, and hardware dependent software;

cloning one or more of the layers of the CVD data object to each of the multiple computing devices; and maintaining synchronization of at least portions of the user desktop image between the multiple computing devices in the group by:

receiving updates to one or more of the layers of the CVD data object from a one of the computing devices that has been designated a master device;

pushing down the received updates to cloned copies of the CVD data object on remaining computing devices in the group that have not been designated the master device by performing a live synchronization of the user files of the remaining computing devices with the user files on the CVD data object of the master device; and upon determining that one of the remaining computing devices is to become designated as a new master device:

performing a smart merge operation by merging one or more of application software, an operating system, and hardware dependent software layers of the CVD data object of the master device onto the one of the remaining computing devices, the smart merge operation resulting in corresponding one or more of application software, operating system, and hardware dependent software layers on a CVD data object of the one of the remaining computing devices containing at least some data that is different than the one or more of the application software, operating system, and hardware dependent software layers on the CVD data object on the master device, wherein the smart merge operation results in data on the new master device that is a combination of updates to one or more of the layers of the CVD data object from the master device and updates to one or more of the layers of the CVD data object on the device designated as the new master device; and designating the one of the remaining computing devices as the new master device.

2. The method of claim 1 wherein the remaining computing devices in the group are designated inactive devices and are not permitted to update the one or more of the layers of the CVD data object stored on the server except for updating user supplied content.

3. The method of claim 1 wherein the live synchronization is performed by merging user files from the user content layer of the CVD data object of the master device with user files on the CVD data object on the remaining computing devices in the group.

4. The method of claim 1 wherein the smart merge operation results in a combined set of applications on the new master device, including some applications from the master device and some applications from the device designated as the new master device that are not present on the master device.

5. The method of claim 4 wherein the combined set of applications is determined by invoking a shim to modify registry values on the new master device.

6. The method of claim 4 wherein the combined set of applications are centrally administered applications and not user downloaded applications.

7. The method of claim 1 wherein the smart merge operation results in data on the new master device that includes operating system registry hive values from both the master device and from the device designated as the new master device.

8. The method of claim 1 wherein the smart merge operation results in a combination of device driver information from both the master device and from the device designated as the new master device.

9. The method of claim 1 wherein the smart merge operation is performed using one or more shims invoked during designated system events.

10. The method of claim 9 wherein the designated system events are one or more of startup, pre-upload, and pre-pivot boot events.

11. The method of claim 9 wherein the one or more shims are designated as active by one or more policies associated with the smart merge operation.

12. The method of claim 11 wherein the one or more policies define what data should not be copied and/or what registry values should not be copied.

13. The method of claim 1 wherein, when the smart merge operation determines conflicts, conflicts are resolved by defaulting to values from one or more of the master device layers.

14. The method of claim 1 wherein the smart merge operation is performed when instructed by a user.

15. The method of claim 14 wherein the user instructs whether to perform a smart merge operation through a user interface construct.

16. The method of claim 15 wherein the user interface construct is at least one of a dialog window, a pop-up, and a balloon.

17. The method of claim 1 wherein the smart merge operation downloads updates to a staging area of the new master device.

18. A non-transitory computer-readable medium stored in a server computing system containing content for synchronizing a user desktop image across multiple computing devices connected via a network, by performing a method comprising:

creating and storing an N-to-1 mapping in which multiple distinct computing devices are bound in a group to a single centralized virtual desktop (CVD) data object stored and maintained by the server, wherein the CVD data object defines one or more layers that include user files, user profile and settings, application software, an operating system, and hardware dependent software;

cloning one or more of the layers of the CVD data object to each of the multiple computing devices; and maintaining synchronization of at least portions of the user desktop image between the multiple computing devices in the group by:

receiving updates to one or more of the layers of the CVD data object from a one of the computing devices that has been designated a master device;

pushing down the received updates to cloned copies of the CVD data object on remaining computing devices in the group that have not been designated the master device by performing a live synchronization of the user files of the remaining computing devices with the user files on the CVD data object of the master device; and upon determining that one of the remaining computing devices is to become designated as a new master device:

performing a smart merge operation by merging one or more of application software, an operating system, and hardware dependent software layers of the CVD data object of the master device onto the one of the remaining computing devices, the smart merge operation resulting in corresponding one or more of application software, operating system, and hardware dependent software layers on a CVD data object of the one of the remaining computing devices containing at least some data that is different than the one or more of the application software, operating system, and hardware dependent software layers on the CVD data object on the master device, wherein the smart merge operation results in data on the new master device that is a combination of updates to one or more of the layers of the CVD data object from the master device and updates to one or more of the layers of the CVD data object on the device designated as the new master device; and designating the one of the remaining computing devices as the new master device.

19. The computer-readable medium of claim 18 wherein the network that connects the multiple computing devices upon which a user desktop image is synchronized is a local area network or a wide area network.

20. The computer-readable medium of claim 18 wherein the smart merge operation is performed when the operating systems of the master device and the new master device are the same.

21. The computer-readable medium of claim 18 wherein the multiple computing devices for which synchronization is performed includes two or more different types of devices including at least one tablet device.

22. The computer-readable medium of claim 18 wherein the multiple computing devices for which synchronization is performed includes at least two different devices from a set of a personal computer workstation, a laptop, a mobile device and/or a virtual machine.

23. A server computing system for synchronizing a user desktop image across multiple distinct computing devices connected via a network, comprising:

a single centralized virtual desktop (CVD) data object stored and maintained by the server, wherein the CVD data object defines one or more layers that include user files, user profile and settings, application software, an operating system, and hardware dependent software;

mapping logic that creates and stores an N-to-1 mapping in which the multiple distinct computing devices are bound in a group to the CVD object;

cloning logic that is configured, when executed, to clone one or more of the layers of the CVD data object to each of the multiple computing devices; and synchronization logic that is configured, when executed to, for each computing device of the multiple distinct computing devices, synchronize at least portions of the user desktop image between the multiple computing devices in the group by:

receiving updates to one or more of the layers of the CVD data object from a one of the computing devices that has been designated a master device;

pushing down the received updates to cloned copies of the CVD data object on remaining computing devices in the group that have not been designated the master device by performing a live synchronization of the user files of the remaining computing devices with the user files on the CVD data object of the master device; and upon determining that one of the remaining computing devices is to become designated as a new master device:

performing a smart merge operation by merging one or more of application software, an operating system, and hardware dependent software layers of the CVD data object of the master device onto the one of the remaining computing devices, the smart merge operation resulting in corresponding one or more of application software, operating system, and hardware dependent software layers on a CVD data object of the one of the remaining computing devices containing at least some data that is different than the one or more of the application software, operating system, and hardware dependent software layers on the CVD data object on the master device, wherein the smart merge operation results in data on the new master device that is a combination of updates to one or more of the layers of the CVD data object from the master device and updates to one or more of the layers of the CVD data object on the device designated as the new master device; and designating the one of the remaining computing devices as the new master device.

24. The server of claim 23 wherein the multiple computing devices for which synchronization logic is performed comprise one or more of a personal computer, a laptop, a mobile device, a tablet, and/or a virtual machine.

25. The server of claim 23 wherein the smart merge operation is performed by shim logic executed at a designated time.

26. The server of claim 25 wherein the designated time is one of more of at startup time, at pre-upload time, and at pre-pivot boot time.

27. The server of claim 25 wherein the shim logic includes one or more of: logic to merge network components, logic to merge and/or de-duplicate a program database, logic to maintain a driver store, logic to handle application-specific licenses, logic to merge a database, and logic to merge registry values.

* * * * *